(12) United States Patent
Stegemann

(10) Patent No.: US 6,928,286 B2
(45) Date of Patent: Aug. 9, 2005

(54) METHOD OF FREQUENCY SYNCHRONIZATION IN A WIRELESS COMMUNICATIONS SYSTEM AND CONFIGURATION FOR IMPLEMENTING THE METHOD

(75) Inventor: Georg Stegemann, Gernlinden (DE)

(73) Assignee: Infineon Technologies AG, Munich (DE)

( * ) Notice: Subject to any disclaimer, the term of this patent is extended or adjusted under 35 U.S.C. 154(b) by 618 days.

(21) Appl. No.: 10/036,253

(22) Filed: Oct. 22, 2001

(65) Prior Publication Data

US 2002/0082031 A1 Jun. 27, 2002

Related U.S. Application Data

(63) Continuation of application No. PCT/DE00/01120, filed on Apr. 11, 2000.

(30) Foreign Application Priority Data

Apr. 22, 1999 (DE) .......................................... 199 18 387

(51) Int. Cl.$^7$ ................................................. H04Q 7/20
(52) U.S. Cl. .................... 455/447; 455/450; 455/452.1; 455/501; 455/502
(58) Field of Search ................................ 455/447, 450, 455/501, 502, 114.2, 67.13; 370/324, 329, 330

(56) References Cited

U.S. PATENT DOCUMENTS

| 4,476,566 A | | 10/1984 | Dent | |
|---|---|---|---|---|
| 5,386,435 A | * | 1/1995 | Cooper et al. | 375/134 |
| 5,394,433 A | * | 2/1995 | Bantz et al. | 375/132 |
| 5,425,049 A | * | 6/1995 | Dent | 375/132 |
| 5,875,186 A | | 2/1999 | Belanger et al. | |
| 5,978,366 A | * | 11/1999 | Massingill et al. | 370/337 |
| 5,978,674 A | * | 11/1999 | Jackson et al. | 455/419 |
| 6,031,864 A | * | 2/2000 | Bauchot et al. | 375/133 |
| 6,680,920 B1 | * | 1/2004 | Wan | 370/311 |

FOREIGN PATENT DOCUMENTS

| DE | 44 32 926 A1 | 3/1996 |
|---|---|---|
| EP | 0 650 274 A2 | 4/1995 |
| EP | 0 650 304 A2 | 4/1995 |

OTHER PUBLICATIONS

"A Class of Frequency Hop Codes with Nearly Ideal Characteristics for Use in Multiple–Access Spread–Spectrum Communications and Radar and Sonar Systems" (Maric et al.), IEEE Transactions on Communications, No. 9, New York, 1992, pp. 1442–1447.

* cited by examiner

Primary Examiner—Temica M. Beamer
(74) Attorney, Agent, or Firm—Laurence A. Greenberg; Werner H. Stemer; Ralph E. Locher

(57) ABSTRACT

The wireless communications system synchronizes the current frequency and permits communication under the DECT protocol between a mobile unit and a fixed base station with rapid and frequent changes in frequency, as defined for example in the ADCT protocol. For this purpose a key is derived from the identification code transmitted by the base station. Lists containing random or pseudo-random frequency sequences are specified, and one of the lists is selected depending on the key transmitted, and the corresponding frequencies are used for the frequency change.

12 Claims, 3 Drawing Sheets

METHOD OF FREQUENCY SYNCHRONIZATION IN A WIRELESS COMMUNICATIONS SYSTEM AND CONFIGURATION FOR IMPLEMENTING THE METHOD

CROSS-REFERENCE TO RELATED APPLICATION

This application is a continuation of copending International Application No. PCT/DE00/01120, filed Apr. 11, 2000, which designated the United States.

BACKGROUND OF THE INVENTION

Field of the Invention

The invention lies in the communications field and concerns, more specifically, a method for synchronizing the frequency in wireless or cordless telephony. A mobile unit and a fixed base station communicate over a defined number of frequencies, and a message containing a code identifying the base station is transmitted during a time slot within a time frame. The invention also pertains to a configuration for implementing the method.

In wireless communications, time frames of a fixed length are specified which are divided into time slots of a defined length and number. The base station transmits within a time slot, and the mobile unit must synchronize itself with the associated base station, i.e. it must find the time slot and the frequency at which the base station is transmitting messages. Amongst other things, these messages contain information on the current frequency and time slot, plus a code that identifies the base station. A conversation can be initiated and accepted respectively only once a certain number of messages have been received on this channel.

If a transmission is established from the mobile unit to the base station, this takes place on a defined channel, i.e. in a defined time slot and at a defined frequency that remains the same until it needs to be changed, possibly because of interference from a noise source.

A widely used protocol in Europe that defines transmission in wireless communications is the Digital European Wireless Telecommunications Protocol (DECT). There, the frequency transmission band is divided into relatively few frequency bands. In addition the DECT protocol is not suitable for fast channel changes, whether for transmitting the message containing frequency information and identification code or transmitting useful data, nor for frequent and rapid frequency changes.

A widely used protocol in the United States is the American Digital Wireless Telecommunications Protocol (ADCT). There, the transmission band is divided into a larger number of frequency bands, e.g. 75 frequency bands, where each of the frequencies must on average be used equally frequently. This is meant to ensure that the radiated power is distributed evenly over the whole frequency band. Very frequent changes in frequency are thus required in this system, e.g. after every time frame, so that each message is transmitted at a different frequency. This rapid and frequent change in frequency is referred to as "frequency hopping."

SUMMARY OF THE INVENTION

It is accordingly an object of the invention to provide a method and an apparatus for frequency-synchronization in a wireless telephone system, which overcomes the above-mentioned disadvantages of the heretofore-known devices and methods of this general type and which can be used to perform a rapid and frequent change in frequency as specified in the ADCT protocol while observing the stipulations of the DECT protocol.

With the foregoing and other objects in view there is provided, in accordance with the invention, a frequency-synchronizing method in a wireless communications system, which comprises:

communicating between a mobile unit and a stationary base station over a defined number of frequencies;

transmitting a message containing a code identifying the base station during a time slot within a time frame;

deriving a key from the identification code;

specifying a defined number of different, unique frequency sequences each containing all the frequencies of the defined number of frequencies;

assigning one of the frequency sequences to the key and selecting the one frequency sequence with the key; and consecutively changing to the frequencies contained in the assigned frequency sequence in the defined sequence by the base station and the associated mobile unit.

In other words, a key is derived from at least a portion of the identification code, a defined number of different, unique frequency sequences are specified, each of which contains all the frequencies, one of these frequency sequences is assigned to the control signal and this frequency sequence is selected by the control signal, and the frequencies contained in the assigned frequency sequence are used consecutively in the defined sequence by the base station concerned and the mobile unit when there is a frequency change.

There is also provided, in accordance with the invention, a configuration for frequency-synchronization between a base station and a mobile unit each configured to implement the above-outlined method. The novel configuration comprises a frequency-change computation unit provided in the base station and in the mobile unit, a key register for storing the key, and a frequency register defining a current frequency, said frequency-change computation unit having an input receiving the contents of said key register and the contents of said frequency register, and having an output connected to said frequency register.

In other words, the objects of the invention are achieved with the novel configuration in that there is provided a frequency-change computation unit in both the base station and the mobile unit, the inputs of which receive the contents of a key register storing the key and the contents of a frequency register defining the current frequency, and the outputs of which are connected to the frequency register.

A fundamental idea of the invention involves a method based on the DECT protocol in which a specific number of frequency lists are generated. The frequencies are randomly or pseudo-randomly distributed within each list. Each list is unique, i.e. each frequency appears just once in such a list. Since the current frequency and the identification code are known, one can find out from the received message (based on the DECT protocol for instance) which of these lists is being used. Then, whenever there is a frequency change, one can easily find out the next frequency from the list concerned.

The invention has the advantage that no changes need be made to the DECT protocol, which can be adopted without any modification. Thus no additional channels are required for transmitting the frequency sequence.

In principle, the frequency lists could be saved in a complete table. In one preferred embodiment of the invention, however, each of the lists with the frequency or channel sequences are calculated during continuous operation using different algorithms, in which each subsequent channel is determined on the basis of the immediately preceding channel.

A particularly simple algorithm which is nonetheless adequate for most applications involves the frequency of a channel being calculated as follows for 40 lists: $f_{x+1}$=mod $(75[f_x+Y])$, where Y=1, 2, 4, 7, 8, 11, 13, 14, 16 , . . . , 68, 71, 73, 74.

In accordance with an advantageous embodiment of the invention involves each frequency sequence having several different, unique subfrequency sequences identified by subkeys. Amongst other options, these are defined in an additional table both in the base station and in the mobile unit. The subkey is transmitted together with the message from the base station to the mobile unit, for example in redundant bit locations.

In this embodiment, once the frequencies in a subsequence have been run through, the system starts to run through the next sub-sequence automatically according to the additional table and the relevant subkey. Thus the system no longer calculates and runs through a unique sequence of n frequency values, but follows a sequence of unique sub-sequences that are identified by the subkey.

It can also be useful to retain a frequency for a defined number of time frames, for example forty time frames, before the frequency is changed according to the relevant list, and to transmit a piece of information specifying how many times the current frequency will be used for transmission. This purpose is adequately met by a counter in the mobile unit that evaluates the information specifying the number of time frames during which transmission is made at the same frequency. The information is derived by simple means from the message, which apart from containing the information already described above on the current frequency and identification code, also contains check bits, e.g. a Block Check Message, which can be assigned uniquely to a base station and an associated mobile unit.

Other features which are considered as characteristic for the invention are set forth in the appended claims.

Although the invention is illustrated and described herein as embodied in method for synchronizing the frequency in wireless communications and arrangement for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
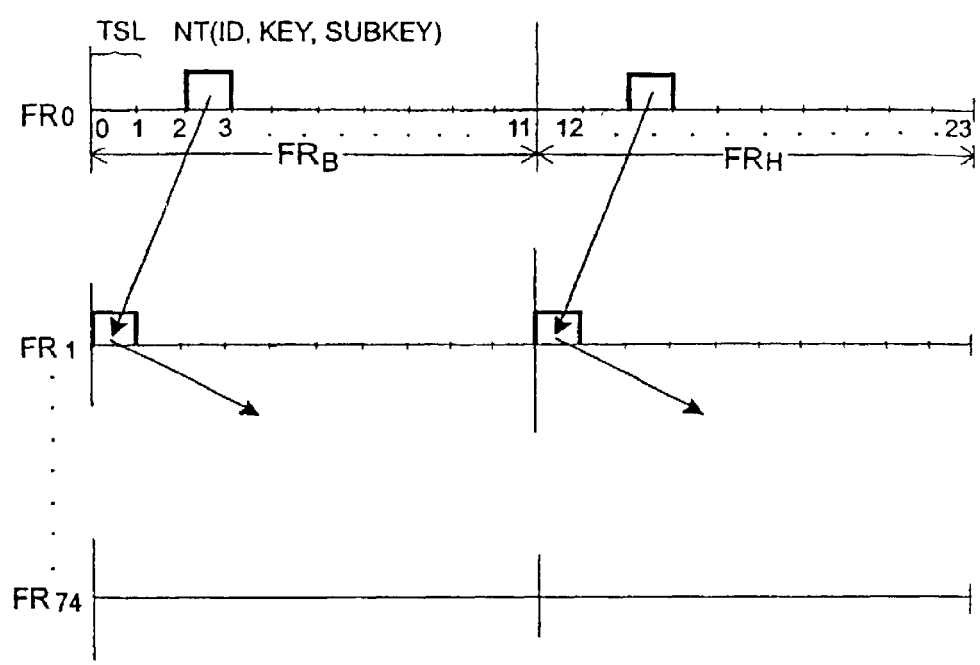
FIG. 1 is a schematic diagram of a transmission mode.

Referring now to the figures of the drawing in detail and first, particularly, to FIG. 1 thereof, there are shown examples of three frequency channels FR 0, FR 2 and FR 74, each with two time frames $FR_B$, $FR_H$, in separate lines above one another. The left time frame $FR_B$ is associated with a base station, and the time frame $FR_H$ shown on the right is associated with a mobile unit.

Each time frame $FR_B$, $FR_H$ is divided into a defined number of time slots TSL. In this example, each time frame has twelve time slots TSL numbered consecutively from 0 to 11 for the base station and from 12 to 23 for the mobile unit.

In order to synchronize the base station and the mobile unit, the base station transmits in a fixed time slot and using a defined frequency sequence, information that includes a message NT, which contains the code identifying the base station. The mobile unit is first set to receive at any one of the frequencies from these frequency sequences. If the transmitted frequency is the same as the frequency set at the receiving end, and the associated base station is identified, the mobile unit synchronizes itself with the base station. Then, according to the invention, the frequency is changed on the basis of the contents of a series of frequency lists, which specify the next frequency in question. The criterion for selection from among the frequency lists is a key that is derived from the identification code.

In principle, any number of frequency lists can be chosen. The frequency lists are different and unique and contain all frequencies used in the frequency-hopping technique, with each list containing each frequency once in a random or pseudo-random sequence. Thus, when a message NT is received by the base station, the next frequency for the frequency change can be determined directly from the current received frequency owing to the unique association between a list and a base station.

Figure 2:
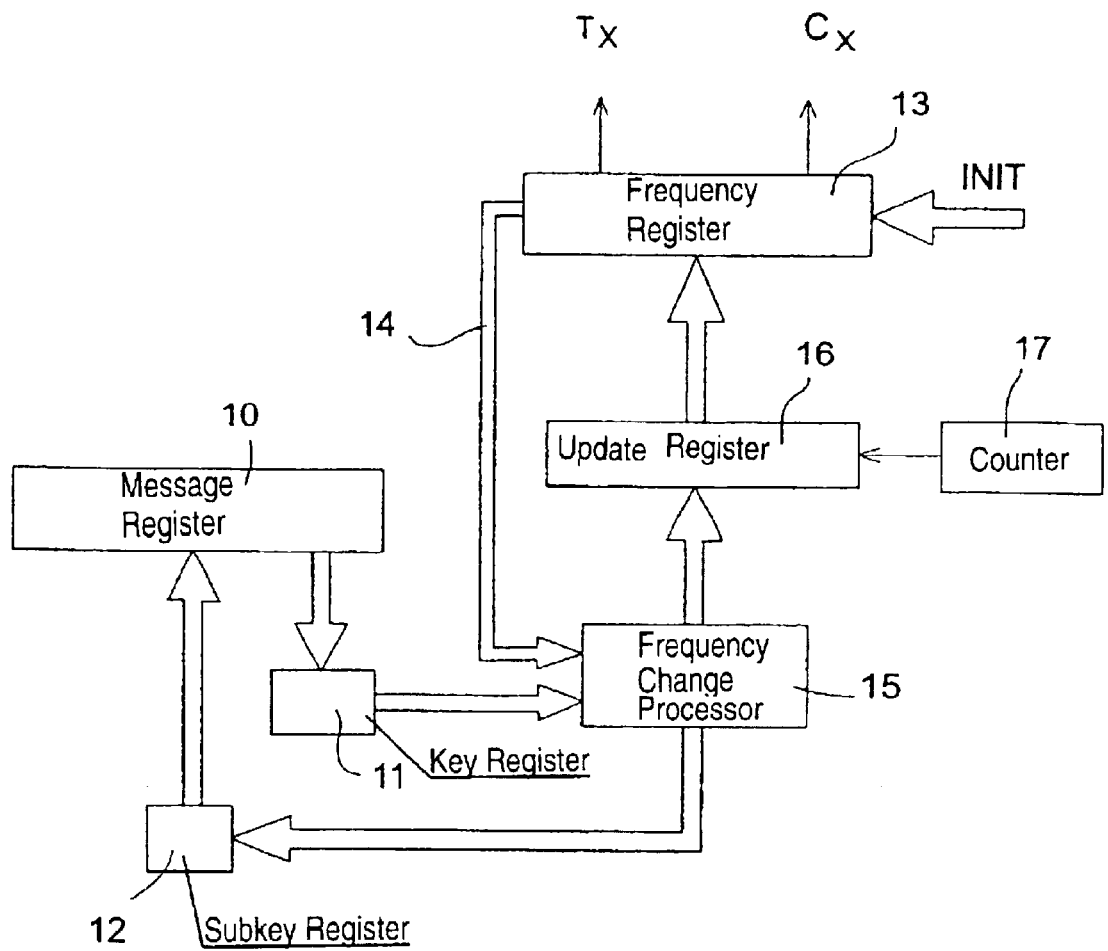
FIG. 2 is a block diagram of a base station.

Referring now to FIG. 2, there is shown a message register 10, for a base station containing the message NT with the identification code ID of the base station, which is transmitted in almost every time frame $FR_B$. This message is typically composed of 40 bits. A key that is stored in a key register 11 and can be uniquely assigned to the base station is derived from at least one section of this message, for example the six least significant bits. Another key, the subkey, is incorporated in another section of the message NT from a subkey register 12. The subkey can be incorporated in redundant bits of the message NT for instance. It is provided by the frequency-change computation unit 15.

A frequency register 13 contains information on the current frequency, i.e. the contents of the frequency register 13 define the current frequency for communication between the base station and the mobile unit. It is initially set by a signal INIT.

The contents of the frequency register 13 are fed via a feedback line 14 to the frequency-change computation unit 15, to which the contents of the key register 11 and the subkey register 12 are also passed as input parameters for calculating the next frequency. The frequency-change computation unit 15 works on the basis of a predefined algorithm in a way that enables the next frequency to be calculated from the current frequency given by frequency register 13, and from the key and subkey given by the key register 11 and the subkey register 12, for a rapid and frequent change in frequency, as is necessary for example for an ADCT-compliant frequency-hopping technique. The calculated next frequency is fed to an update register 16, which is controlled by a time-frame counter 17.

The update register 16 stores the calculated "next" frequency over a required number of time frames $FR_B$ before its contents are passed to the frequency register 13. Thus, optionally, a frequency change can be made every time frame $FR_B$ or only after a defined number of time frames.

Figure 3:
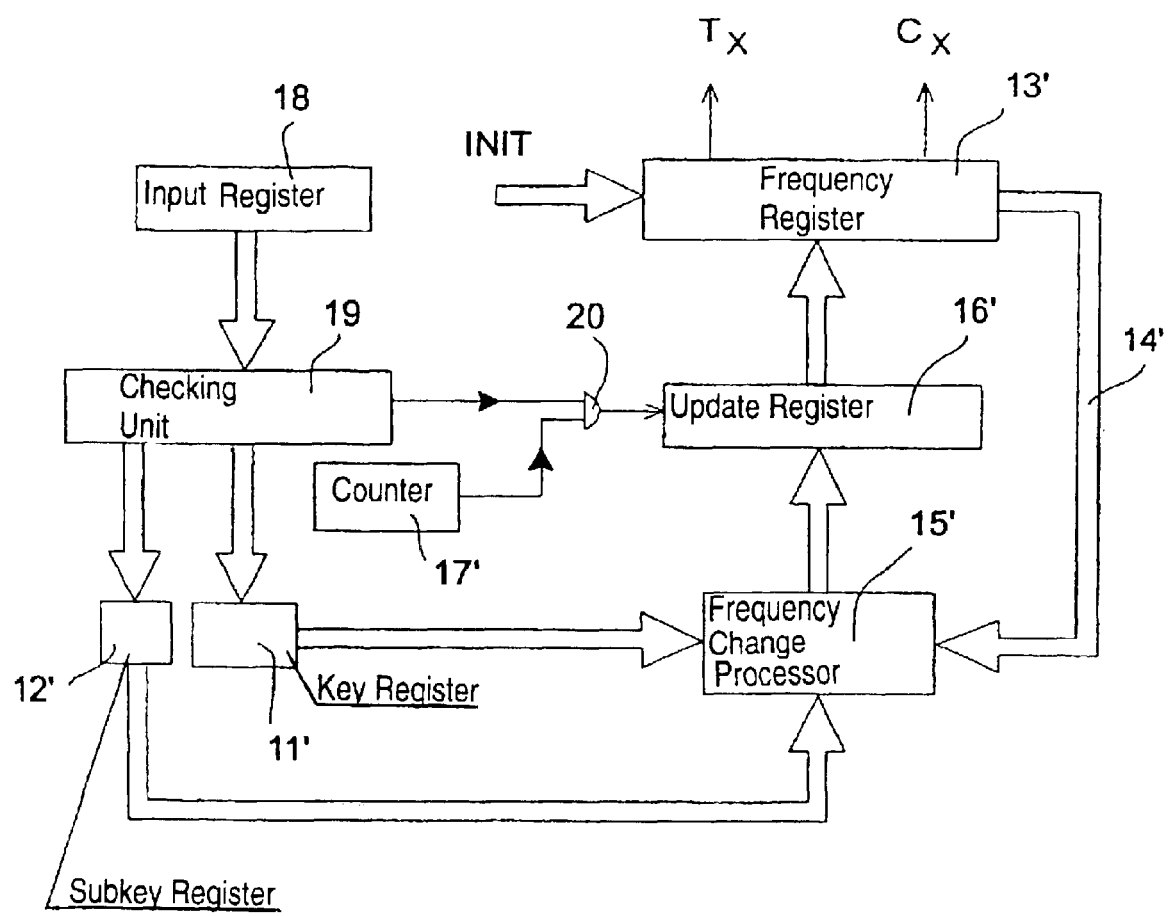
FIG. 3 is a block diagram of a mobile unit.

As shown in FIG. 3, the mobile unit has an input register 18 in which the message NT received from the base station is stored. The message is checked in a checking unit 19 for any errors in the received message and/or in the identification code ID. The identification code ID is stored in a key register 11'. If the message is valid and contains no errors, an update register 16' is enabled, provided the output signal from a time-frame counter 17' is also enabled. An AND gate 20 is shown schematically in the figure for this purpose. In the same way as shown in the base station in FIG. 2, the next frequency for a rapid and frequent change in frequency is calculated in a frequency-change computation unit 15' on the basis of the contents of a frequency register 13' and the contents of the key register 11' and a subkey register 12', and on the basis of the predefined frequency list, this next frequency being stored in the update register 16' until it is passed from there to the frequency register 13'.

While no valid message is received, and thus while the update register is not enabled, the frequency register 13' continues to hold an initialized frequency.

I claim:

1. A frequency-synchronizing method in a wireless communications system, which comprises:
communicating between a mobile unit and a stationary base station over a defined number of frequencies;
transmitting a message containing a code identifying the base station during a time slot within a time frame;
deriving a key from the identification code;
specifying a defined number of different, unique frequency sequences each containing all the frequencies of the defined number of frequencies;
setting the defined number of different, unique frequency sequences to be 40 frequency sequences, and calculating the frequency sequence with the following algorithm: $f_{x+1}=\mod(75[f_x+Y])$; Y=1, 2, 4, 7, 8, 11, 13, 14, 16, . . . , 68, 71, 73, 74; wherein $f_x$ is a frequency in the frequency sequence;
assigning one of the frequency sequences to the key and selecting the one frequency sequence with the key; and
consecutively changing to the frequencies contained in the assigned frequency sequence in the defined sequence by the base station and the associated mobile unit.

2. The method according to claim 1, which comprises calculating each of the frequency sequences with different algorithms, and thereby determining each subsequent frequency on a basis of an immediately preceding frequency.

3. The method according to claim 1, which comprises retaining a frequency for a defined number of time frames before changing the frequency, and transmitting an item of information specifying how many times a current frequency will be used for transmission.

4. The method according to claim 1, which comprises, in the mobile unit, checking the message transmitted from the base station for errors, and adopting the receiver key and make a frequency change only after an error-free message is received.

5. A configuration for synchronizing a frequency between a base station and a mobile unit each configured to implement the method according to claim 1, the configuration comprising a frequency-change computation unit provided in the base station and in the mobile unit, a key register for storing the key, and a frequency register defining a current frequency, said frequency-change computation unit having an input receiving the contents of said key register and the contents of said frequency register, and having an output connected to said frequency register.

6. The configuration according to claim 5, which comprises an update register controlled by a time-frame counter connected between said frequency register and said output of said frequency-change computation unit.

7. A frequency-synchronizing method in a wireless communications system, which comprises:
communicating between a mobile unit and a stationary base station over a defined number of frequencies;
transmitting a message containing a code identifying the base station during a time slot within a time frame;
deriving a key from the identification code;
specifying a defined number of different, unique frequency sequences each containing all the frequencies of the defined number of frequencies, each frequency sequence having several different, unique frequency subsequences specified by subkeys derived from the message;
assigning one of the frequency sequences to the key and selecting the one frequency sequence with the key; and
consecutively changing to the frequencies contained in the assigned frequency sequence in the defined sequence by the base station and the associated mobile unit.

8. The method according to claim 7, which comprises, once a frequency subsequence has been run through completely, using another frequency subsequence.

9. A configuration for synchronizing a frequency between a base station and a mobile unit each configured to implement the method according to claim 7, the configuration comprising a frequency-change computation unit provided in the base station and in the mobile unit, a key register for storing the key, and a frequency register defining a current frequency, said frequency-change computation unit having an input receiving the contents of said key register and the contents of said frequency register, and having an output connected to said frequency register.

10. The configuration according to claim 9, which comprises an update register controlled by a time-frame counter connected between said frequency register and said output of said frequency-change computation unit.

11. A configuration for synchronizing a frequency between a base station and a mobile unit, the configuration comprising:
a key register for storing a key;
a frequency register defining a current frequency; and
a frequency-change computation unit provided in the base station and in the mobile unit, said frequency-change computation unit having an input receiving contents of said key register and contents of said frequency register, and having an output connected to said frequency register;
said configuration programmed to:
communicate between the mobile unit and the base station over a defined number of frequencies;
transmit a message containing a code identifying the base station during a time slot within a time frame;
derive the key from the identification code;
specify a defined number of different, unique frequency sequences each containing all the frequencies of the defined number of frequencies;
set the defined number of different, unique frequency sequences to be 40 frequency sequences, and calculate the frequency sequence with the following algorithm: $f_{x+1}=\mod(75[f_x+Y])$; Y=1, 2, 4, 7, 8, 11, 13, 14, 16, . . . , 68, 71, 73, 74; wherein $f_x$ is a frequency in the frequency sequence;

assign one of the frequency sequences to the key and select the one frequency sequence with the key; and consecutively change to the frequencies contained in the assigned frequency sequence in the defined sequence by the base station and the associated mobile unit.

12. A configuration for synchronizing a frequency between a base station and a mobile unit, the configuration comprising:

a key register for storing a key;

a frequency register defining a current frequency; and a frequency-change computation unit provided in the base station and in the mobile unit, said frequency-change computation unit having an input receiving contents of said key register and contents of said frequency register, and having an output connected to said frequency register;

said configuration programmed to:

communicate between the mobile unit and the base station over a defined number of frequencies;

transmit a message containing a code identifying the base station during a time slot within a time frame;

derive the key from the identification code;

specify a defined number of different, unique frequency sequences each containing all the frequencies of the defined number of frequencies, each frequency sequence having several different, unique frequency subsequences specified by subkeys derived from the message;

assign one of the frequency sequences to the key and select the one frequency sequence with the key; and consecutively change to the frequencies contained in the assigned frequency sequence in the defined sequence by the base station and the associated mobile unit.

* * * * *